US011566773B2

(12) United States Patent  
Huo et al.

(10) Patent No.: US 11,566,773 B2  
(45) Date of Patent: Jan. 31, 2023

(54) LENS COVER HAVING LENS ELEMENT

(71) Applicant: HGCI, Inc., Las Vegas, NV (US)

(72) Inventors: Yongfeng Huo, Chengdu (CN); Dengke Cai, Camas, WA (US)

(73) Assignee: HGCI, Inc., Las Vegas, NV (US)

( * ) Notice: Subject to any disclaimer, the term of this patent is extended or adjusted under 35 U.S.C. 154(b) by 0 days.

(21) Appl. No.: 17/591,257

(22) Filed: Feb. 2, 2022

(65) Prior Publication Data

US 2022/0170610 A1    Jun. 2, 2022

Related U.S. Application Data

(63) Continuation of application No. PCT/CN2020/132703, filed on Nov. 30, 2020.

(51) Int. Cl.
    F21V 5/00      (2018.01)
    F21V 5/04      (2006.01)
    A01G 9/24      (2006.01)
    A01G 7/04      (2006.01)

(52) U.S. Cl.
    CPC .............. F21V 5/007 (2013.01); A01G 7/045 (2013.01); A01G 9/249 (2019.05); F21V 5/04 (2013.01)

(58) Field of Classification Search
    CPC .......... F21V 5/007; F21V 5/04; A01G 7/045; A01G 9/249
    See application file for complete search history.

(56) References Cited

U.S. PATENT DOCUMENTS

| | | | |
|---|---|---|---|
| 9,857,051 B2 | 1/2018 | Ikeda et al. | |
| 10,203,086 B2* | 2/2019 | Kang | G02B 19/0061 |
| 10,830,413 B2 | 11/2020 | Mochida | |
| 11,022,274 B2* | 6/2021 | Park | F21V 5/04 |
| 11,199,307 B2* | 12/2021 | Kim | F21V 5/04 |
| 2011/0032701 A1* | 2/2011 | Zhang | F21V 5/007 |
| | | | 362/244 |
| 2014/0328062 A1* | 11/2014 | Ikeda | G02B 19/0066 |
| | | | 362/311.06 |
| 2015/0176774 A1 | 6/2015 | Chen | |
| 2016/0356451 A1* | 12/2016 | Lin | F21V 5/04 |

(Continued)

FOREIGN PATENT DOCUMENTS

| | | |
|---|---|---|
| CN | 101986018 A | 3/2011 |
| CN | 104011461 A | 8/2014 |
| CN | 104421837 A | 3/2015 |

(Continued)

OTHER PUBLICATIONS

Zhang, Miao; International Search Report and Written Opinion of the International Searching Authority issued in International Application No. PCT/CN2020/132703, dated Sep. 2, 2021; 9 pages.

*Primary Examiner* — Tsion Tumebo  
(74) *Attorney, Agent, or Firm* — Ulmer & Berne LLP

(57) ABSTRACT

A lens cover for a plurality of light emitting devices is provided. The lens cover includes a base substrate and an optical lens element. The optical lens element extends from the base substrate and defines a focal center. The optical lens element includes a length and a width and includes an exterior surface and interior surface. The exterior surface extends from the base substrate along an outer perimeter and is symmetrical about the focal center. The interior surface is symmetrical about the focal center.

20 Claims, 15 Drawing Sheets

(56) References Cited

U.S. PATENT DOCUMENTS

2017/0167714 A1* 6/2017 Hong .................... H05K 1/053
2018/0051863 A1* 2/2018 Lee .................... G02B 19/0014

FOREIGN PATENT DOCUMENTS

| CN | 110131603 A | 8/2019 |
| CN | 110869668 A | 3/2020 |
| KR | 20180129413 A | 12/2018 |

* cited by examiner

LENS COVER HAVING LENS ELEMENT

REFERENCE TO RELATED APPLICATIONS

This application is a continuation of International Application No. PCT/CN2020/132703, filed Nov. 30, 2020, entitled Lens Cover Having Lens Element and hereby incorporates this application by reference herein in its entirety.

TECHNICAL FIELD

The apparatus described below generally relates to a light fixture that includes an array of light sources for illuminating an indoor grow facility. Each light source includes a light emitting diode (LED), a lens cover, an encapsulating material that is disposed between the LEDs and the lens cover, and a protective coating provided over an exterior surface of the lens cover.

BACKGROUND

Indoor grow facilities, such as greenhouses, include light fixtures that provide artificial lighting to plants for encouraging growth. Each of these light fixtures typically includes a plurality of LEDs that generate the artificial light for the plants. The environment inside these indoor grow facilities, however, can include different types of gasses and/or airborne fluid particles that cause the optical quality of the LEDs to degrade (e.g., yellow) over time.

SUMMARY

According to some implementations, a lens cover for a plurality of light emitting devices may comprise a base substrate and an optical lens element that extends from the base substrate and defines a focal center, the optical lens element having a length and a width and comprising an exterior surface and an interior surface. The exterior surface extends from the base substrate along an outer perimeter and is symmetrical about the focal center, the exterior surface comprising: a first lengthwise two-dimensional profile at a cross-section taken orthogonal to the width at the focal center, the first lengthwise two-dimensional profile comprising a central profile and a pair of first curved profiles extending from the central profile, the central profile having a central radius of curvature and the first curved profiles each having a first radius of curvature, the central radius of curvature being greater than the first radius of curvature; and a first widthwise two-dimensional profile at a cross-section taken orthogonal to the length at the focal center, the first widthwise two-dimensional profile comprising a pair of second curved profiles extending from the focal center and each having a second radius of curvature. The interior surface is symmetrical about the focal center, the interior surface comprising: a second lengthwise two-dimensional profile at a cross-section taken orthogonal to the length at the focal center, the second lengthwise two-dimensional profile comprising a pair of third curved profiles extending from the focal center and each having a third radius of curvature that is less than the central radius of curvature and greater than the first radius of curvature; and a second widthwise two-dimensional profile at a cross-section taken orthogonal to the length at the focal center, the second widthwise two-dimensional profile comprising a pair of fourth curved profiles extending from the focal center and each having a fourth radius of curvature that is less than the second radius of curvature. Wherein, the width is narrower than the length; the exterior surface and the interior surface can cooperate to define an overall lengthwise two-dimensional shape at a cross-section taken orthogonal to the width at the focal center; and the overall lengthwise two-dimensional shape can have a first material thickness that is thicker at the outer perimeter than at the focal center.

According to some implementations, a lens cover for a plurality of light emitting devices may comprise a base substrate; and an optical lens element defining a focal center having a length and a width and comprising an exterior surface and an interior surface. The exterior surface extends from the base substrate along an outer perimeter that resides within a first imaginary plane, the exterior surface being symmetrical about the focal center, the exterior surface comprising: a first lengthwise two-dimensional profile at a cross-section taken orthogonal to the width at the focal center, the first lengthwise two-dimensional profile comprising a central profile and a pair of first curved profiles extending from the central profile; and a first widthwise two-dimensional profile at a cross-section taken orthogonal to the length at the focal center, the first widthwise two-dimensional profile comprising a pair of second curved profiles extending from the focal center. The interior surface extends from the base substrate along an inner perimeter that resides within a second imaginary plane, the interior surface being symmetrical about the focal center, the interior surface comprising: a second lengthwise two-dimensional profile at a cross-section taken orthogonal to the length at the focal center, the second lengthwise two-dimensional profile comprising a pair of third curved profiles extending from the focal center; and a second widthwise two-dimensional profile at a cross-section taken orthogonal to the length at the focal center, the second widthwise two-dimensional profile comprising a pair of fourth curved profiles extending from the focal center. Wherein: the width is narrower than the length; a plurality of first imaginary lines are provided at different locations on the first curved profile and are tangent to the first curved profile such that each first imaginary line is angled with respect to the first imaginary plane by a first angle; the first curved profile is contoured such that the first angle of each first imaginary line is less than the first angles of the first imaginary lines that are more proximate the first imaginary plane and greater than the first angles of the first imaginary lines that are more proximate the focal center; a plurality of second imaginary lines are provided at different locations on the second curved profile and are tangent to the second curved profile such that each second imaginary line is angled with respect to the second imaginary plane by a second angle; the second curved profile is contoured such that the second angle of each second imaginary line is less than the second angles of the second imaginary lines that are more proximate the second imaginary plane and greater than the second angles of the second imaginary lines that are more proximate the focal center; a plurality of third imaginary lines are provided at different locations on the third curved profile and are tangent to the third curved profile such that each third imaginary line is angled with respect to the third imaginary plane by a third angle; the third curved profile is contoured such that the third angle of each third imaginary line is less than the third angles of the third imaginary lines that are more proximate the third imaginary plane and greater than the third angles of the third imaginary lines that are more proximate the focal center; a plurality of fourth imaginary lines are provided at different locations on the fourth curved profile and are tangent to the fourth curved profile such that each fourth imaginary line is angled with respect to the fourth imaginary plane by a fourth angle; the fourth curved profile is contoured such that the fourth angle of each fourth imaginary line is less than the fourth angles of the fourth imaginary lines that are more proximate the fourth imaginary plane and greater than the fourth angles of the fourth imaginary lines that are more proximate the focal center.

BRIEF DESCRIPTION OF THE DRAWINGS

Various embodiments will become better understood with regard to the following description, appended claims and accompanying drawings wherein:

DETAILED DESCRIPTION

Figure 1:
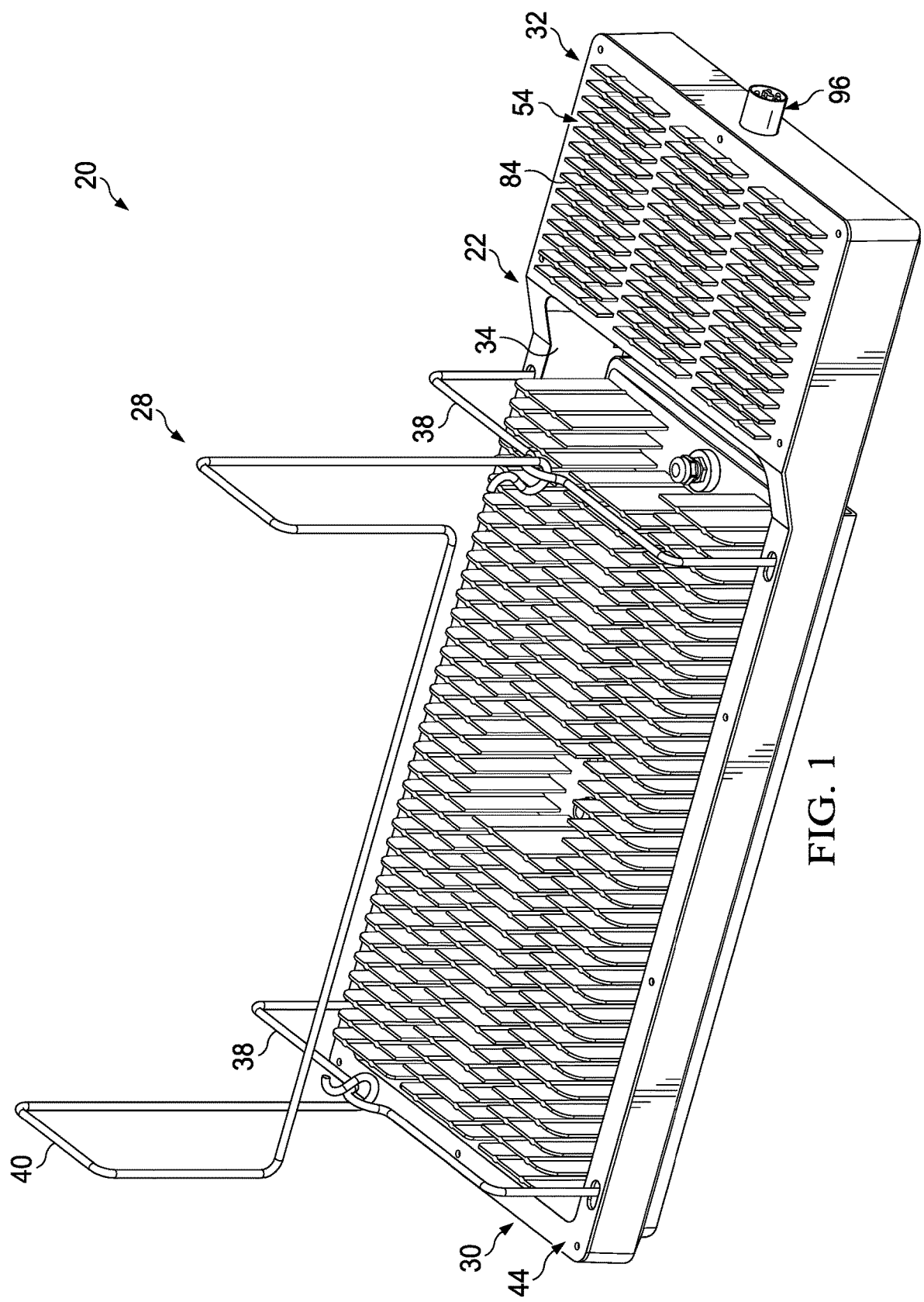
FIG. 1 is an upper isometric view depicting a light fixture, in accordance with one embodiment.
Figure 2:
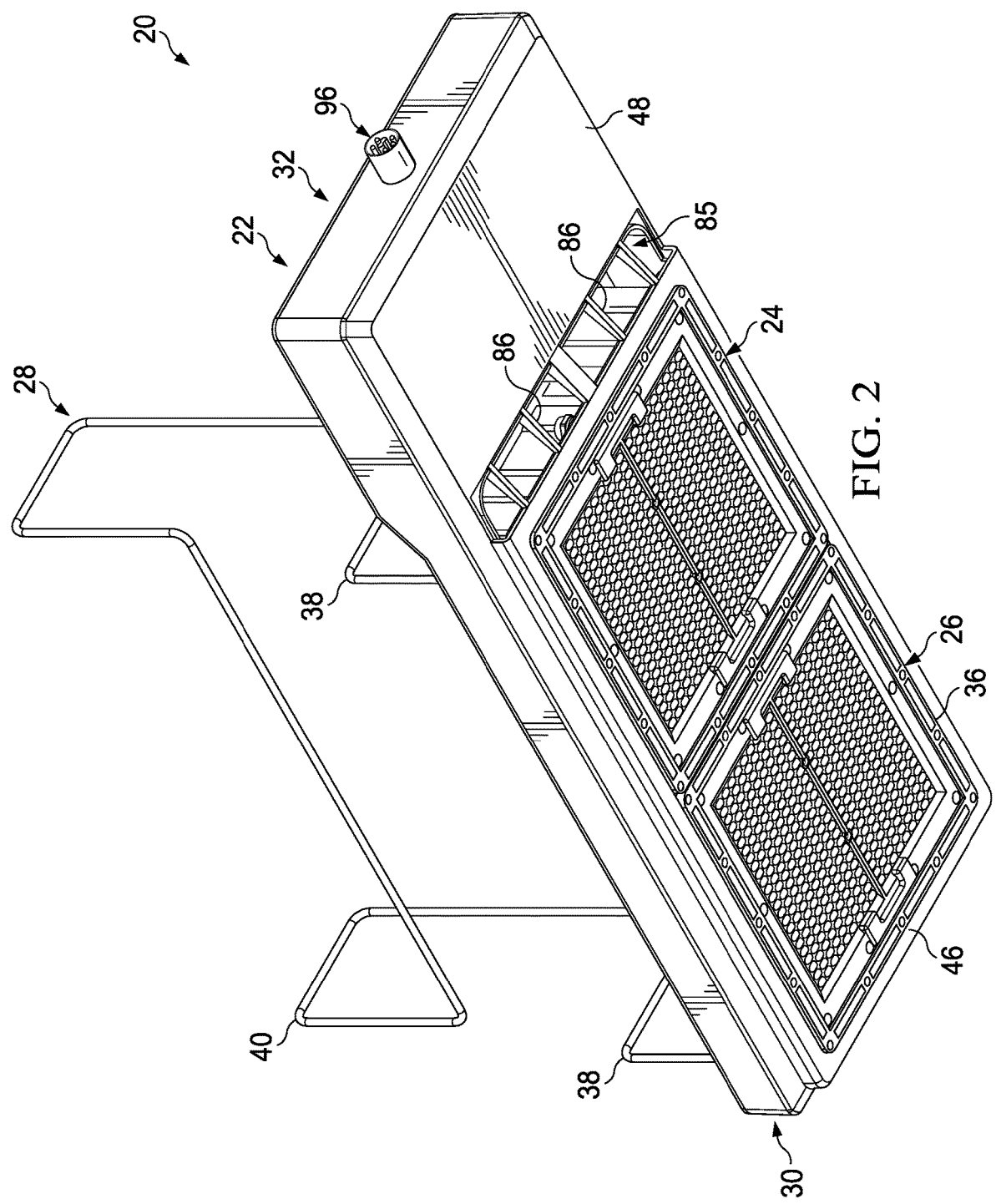
FIG. 2 is a lower isometric view of the light fixture of FIG. 1.

Embodiments are hereinafter described in detail in connection with the views and examples of FIGS. 1-15, wherein like numbers indicate the same or corresponding elements throughout the views. A light fixture 20 for an indoor grow facility (e.g., a greenhouse) is generally depicted in FIGS. 1 and 2 and can include a housing 22, first and second lighting modules 24, 26 (FIG. 2), and a hanger assembly 28. The housing 22 can include a light support portion 30 and a controller support portion 32 adjacent to the light support portion 30. The light support portion 30 can define a lighting receptacle 34 (FIG. 1) and a window 36 (FIG. 2) disposed beneath the lighting receptacle 34. The first and second lighting modules 24, 26 (FIG. 2) can be disposed within the lighting receptacle 34 above the window 36 and can be configured to emit light through the window 36, as will be described in further detail below.

The hanger assembly 28 can facilitate suspension of the light fixture 20 above one or more plants (not shown) such that light emitted through the window 36 from the first and second lighting modules 24, 26 can be delivered to the underlying plant(s) to stimulate growth. The hanger assembly 28 can include a pair of hanger supports 38 and a hanger bracket 40. The hanger supports 38 can be coupled to the housing 22 on opposing sides of the light fixture 20. The hanger bracket 40 can be coupled with the hanger supports 38 and can extend between the hanger supports 38 to facilitate suspension of the light fixture 20 from a ceiling of the indoor grow facility. In one embodiment, as illustrated in FIGS. 1 and 2, the hanger bracket 40 can have a cross-sectional shape that is substantially J-shaped to facilitate selective hanging of the light fixture 20 from a beam or other elongated support member that is provided along a ceiling of the indoor grow facility.

Figure 3:
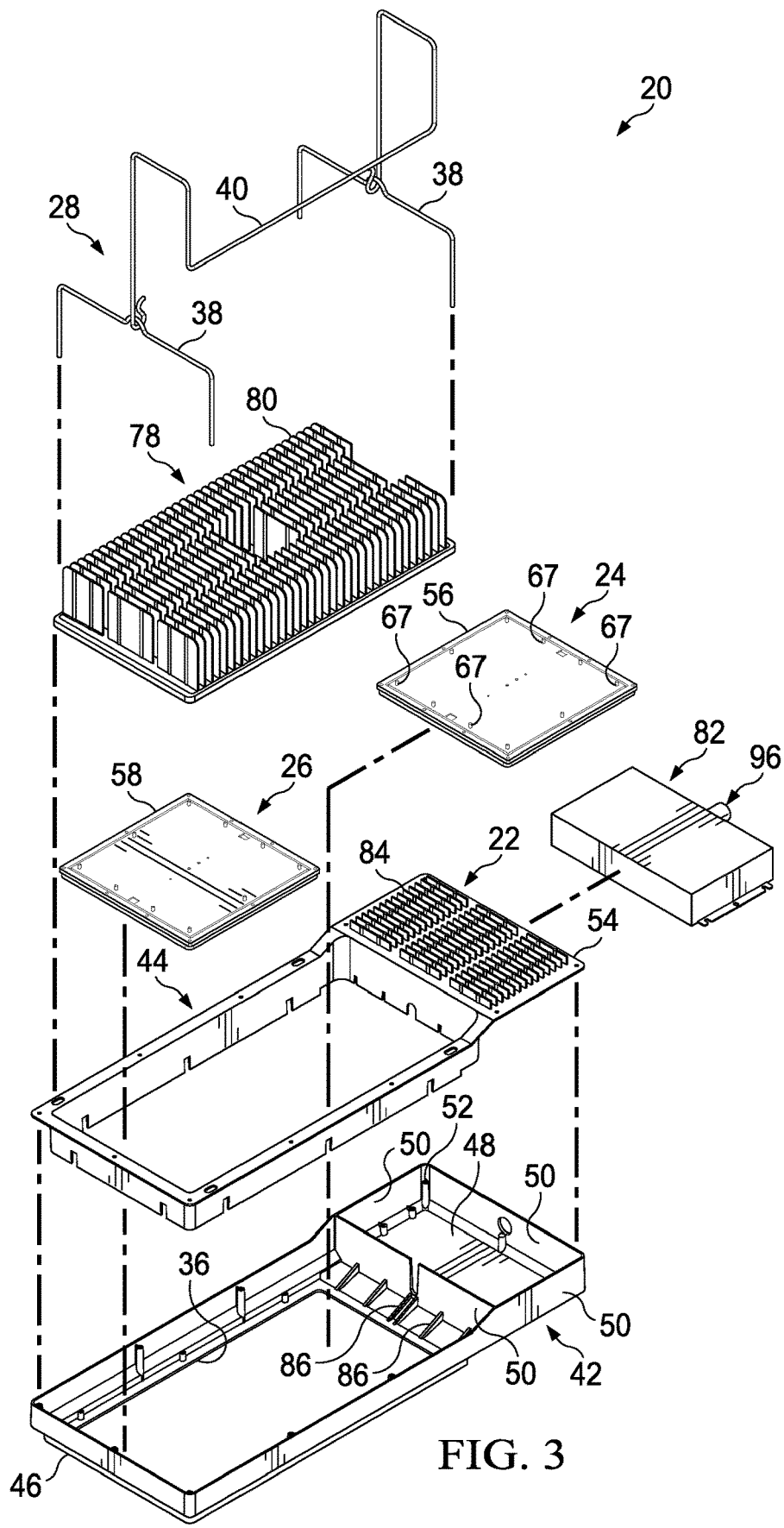
FIG. 3 is a partially exploded upper isometric view of the LED light fixture of FIG. 1.
Figure 4:
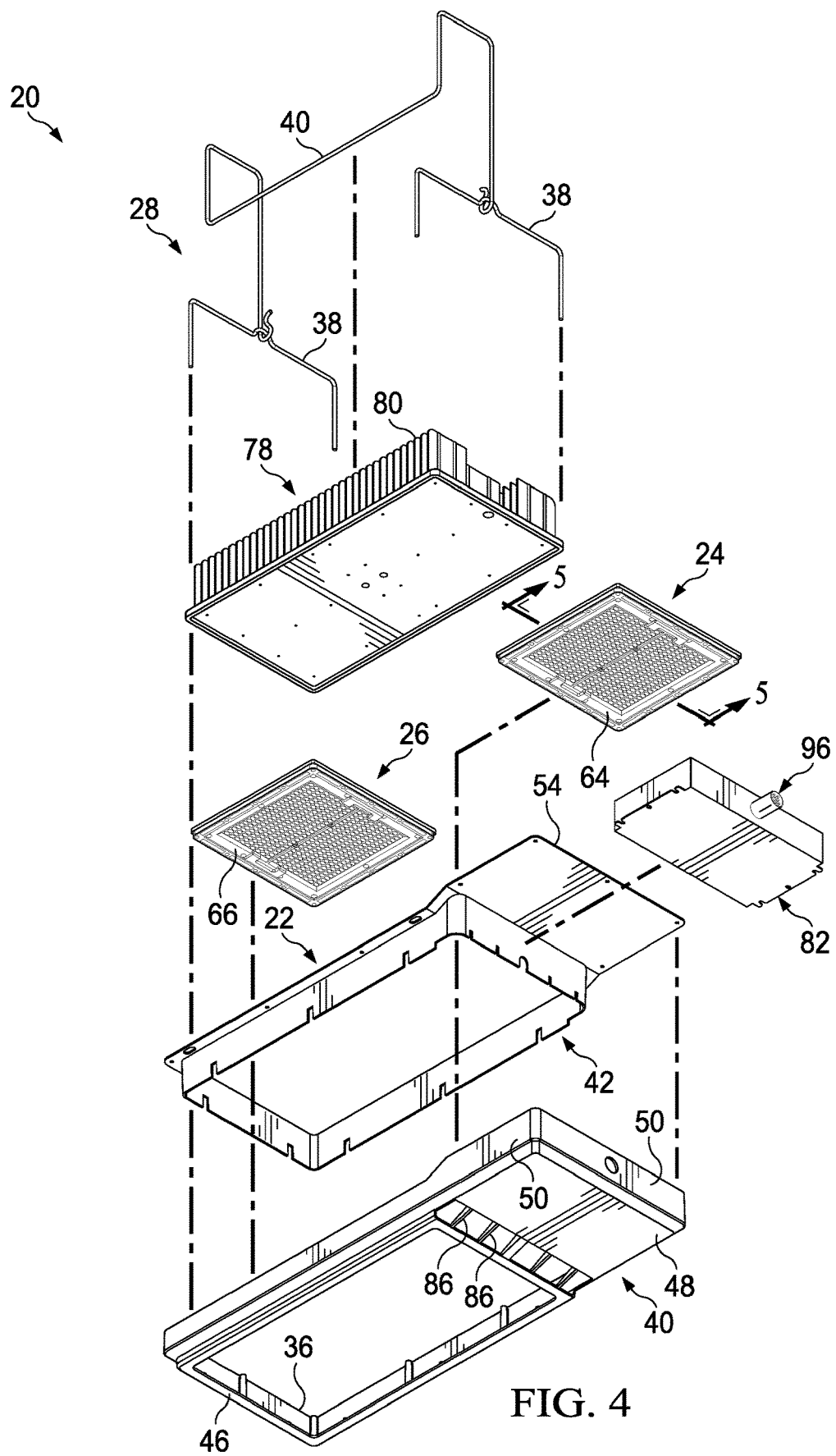
FIG. 4 is a partially exploded lower isometric view of the LED light fixture of FIG. 1.

Referring now to FIGS. 3 and 4, the housing 22 can include a main frame 42 and a cover member 44 that overlies the main frame 42 and is coupled together with the main frame 42 via welding, adhesives, releasable tabs (not shown), fasteners (not shown), or any of a variety of suitable alternative permanent or releasable fastening arrangements. The main frame 42 can include a bottom lighting wall 46 that defines the window 36. As illustrated in FIG. 3, the main frame 42 can include a bottom controller wall 48, and a plurality of sidewalls 50 that cooperate to define a controller receptacle 52. The cover member 44 can include a lid portion 54 that overlies and covers the controller receptacle 52, as illustrated in FIG. 1. The bottom controller wall 48, the sidewalls 50, and the lid portion 54 can form at least part of the controller support portion 32 of the housing 22.

Figure 5:
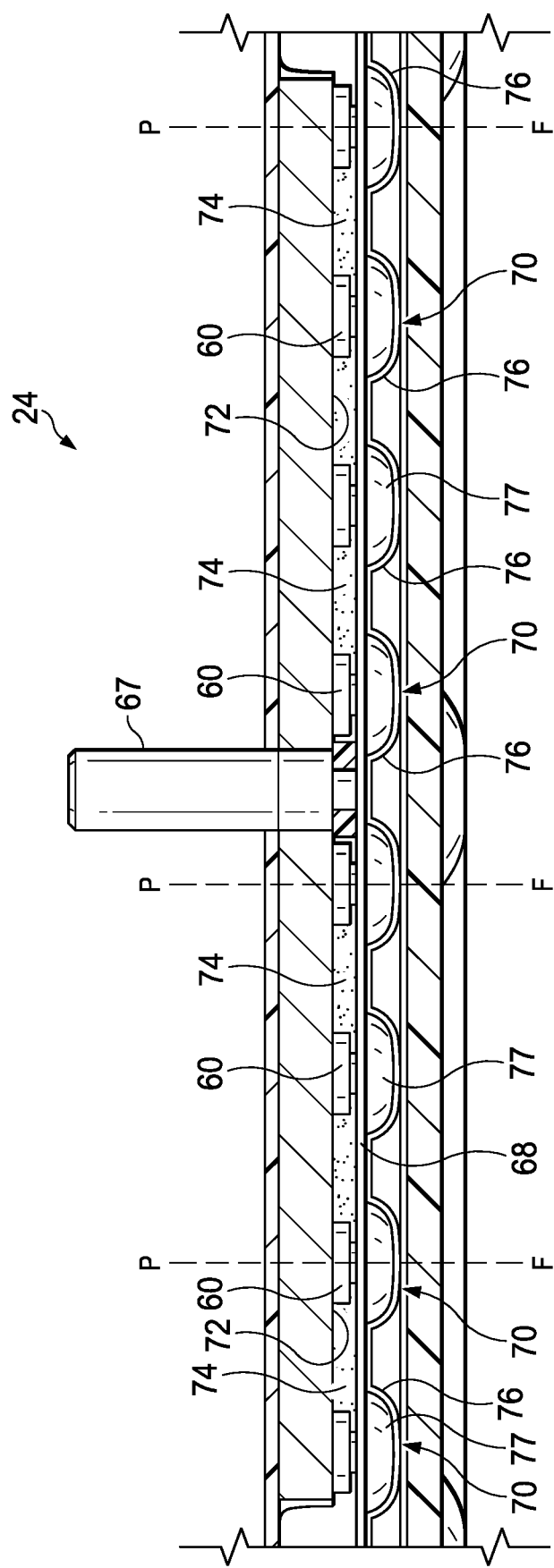
FIG. 5 is a cross-sectional view taken along the line 5-5 in FIG. 4.

As illustrated in FIG. 4, the first and second lighting modules 24, 26 can each include a submount 56, 58, a plurality of light emitting diodes (LEDs) (e.g., 60 in FIG. 5), and a lens cover 64, 66. Referring to FIG. 5, the first lighting module 24 will now be discussed, but can be understood to be representative of the second lighting module 26. The LEDs 60 can comprise surface mount LEDs that are mounted to the submount 56 via any of a variety of methods or techniques commonly known in the art. The LEDs 60 can be any of a variety of suitable configurations that are mounted directly or indirectly to the submount 56. The LEDs 60 can comprise single color LEDs (e.g., capable of emitting only one color of light such as white, red or blue), multi-color LEDs (e.g., capable of emitting different colors such as white, red, and blue) or a combination of both. The submount 56 can be formed of any of a variety of thermally conductive materials that are suitable for physically and thermally supporting the LEDs 60. In one embodiment, the LED 60 can be a square LED that is about 3.5 mm wide and about 3.5 mm long.

The lens cover 64 can overlie the submount 56 and the LEDs 60 and can be coupled with the submount 56 with fasteners 67 or any of a variety of suitable alternative coupling arrangements. The lens cover 64 can include a base substrate 68 that is substantially planar and a plurality of optical lens elements 70 that protrude from the base substrate 68. Each of the optical lens elements 70 can be substantially aligned with respective ones of the LEDs 60 and can be configured to redistribute (e.g., concentrate or disperse) the light emitted from the LEDs 60 towards an area beneath the light fixture 20 (e.g., towards one or more plants). In one embodiment, as illustrated in FIGS. 4 and 5, each of the optical lens elements 70 can have an indented oval shape. However, the optical lens elements 70 can be any of a variety of suitable alternative shapes or combinations thereof for achieving a desired redistribution of light emitted from the LEDs 60.

As illustrated in FIG. 5, the LEDs 60 can each be aligned with respective ones of the optical lens elements 70 such that the physical center P and the focal center F are coaxial. In another embodiment, the LEDs 60 can each be slightly offset with respective ones of the optical lens elements 70 such that the physical center P and the focal center F are non-coaxial. In one embodiment, the lens cover 64 can have a unitary one-piece construction formed of a polycarbonate material and/or polymethyl methacrylate (PMMA). It is to be appreciated, however, that the lens cover 64 can be formed of any of a variety of suitable alternative translucent or transparent materials that can protect underlying LEDs from environmental conditions and can also accommodate a plurality of optical lens elements 70 for redistributing light transmitted from underlying LEDs.

The lens cover 64 can be spaced from the submount 56 such that the lens cover 64 and the submount 56 cooperate to define an interior 72 therebetween. An encapsulating material 74 can be provided within the interior 72 such that the encapsulating material 74 substantially fills the interior 72 and encapsulates the LEDs 60 therein. The encapsulating material 74 can be formed of an optically neutral (or enhancing) material that reduces optical loss in the interior 72 that might otherwise occur without the encapsulating material 74 (e.g., if there was air in the interior 72). In one embodiment, the interior 72 can be filled with enough of the encapsulating material 74 (e.g., filled entirely) to cause the interior 72 to be substantially devoid of air bubbles or other media that would adversely affect the optical integrity between the LEDs 60 and the lens cover 64. The encapsulating material 74 can also protect the LEDs 60 from environmental conditions that might be able to bypass the lens cover 64 such as a gaseous fluid (e.g., greenhouse gas). In one embodiment, the encapsulating material 74 can be a silicone gel such as a methyl type silicone (e.g., polydimethylsiloxane) or a phenyl-type silicone, for example, that has a refractive index of between about 1.35 and 1.6. It is to be appreciated that any of a variety of suitable alternative materials are contemplated for the encapsulating material 74.

The encapsulating material 74 can be substantially softer than the lens cover 64 (e.g., the encapsulating material 74 can have a hardness that is less than a hardness of the lens cover 64). In one embodiment, the encapsulating material 74 can be a flowable material, such as a fluid or gel that can be injected or otherwise dispensed into the interior 72 after the lens cover 64 is assembled on the submount 56. In another embodiment, the encapsulating material 74 can be coated onto the lens cover 64 and/or over the submount 56 and LEDs 60 prior to assembling the lens cover 64 on the submount 56.

Still referring to FIG. 5, a protective coating 76 can be provided over an exterior surface 77 of the lens cover 64. The protective coating 76 can be hydrophobic, oleophobic, and/or chemically resistant such that the exterior surface of the lens cover 64 is protected from harmful environmental conditions that might otherwise adversely affect the optical performance of the optical lens elements 70. The protective coating 76 can additionally or alternatively optically enhance the transmission quality of the optical lens elements 70. In one embodiment, the protective coating 76 can be a thin-film inorganic material that protects against environmental conditions (e.g., chemical etching) and also improves overall transmission quality of the optical lens elements 70. The thin-film inorganic material can be between about 10 nm and about 200 nm thick and can have a refractive index above about 1.49. Some examples of suitable thin-film inorganic materials include MgF2, CaF2, SiO2, Al2O3 and/or TiO2. Although the protective coating 76 is shown to be a single layer arrangement, it is to be appreciated that the protective coating 76 can alternatively be a multi-layer arrangement that is either homogenous (multiple layers of the same material) or heterogeneous (multiple layers of different material).

It is to be appreciated that the light emitted by the first lighting module 24 can conform to a lighting profile (e.g., range of color, overall distribution of light, heat profile) that is defined by the physical configuration of the first lighting module 24 (e.g., the types of LEDs 60 that are utilized (e.g., single color or multi-color), the physical layout of the LEDs 60, the optics provided by the optical lens elements (e.g., 68), the encapsulating material (e.g., 74), the protective coating (e.g., 76), and the overall power consumption). Although various examples of the physical configuration of the first lighting module are described above and shown in the figures, it is to be appreciated that any of a variety of suitable alternative physical configurations of the first lighting module 24 are contemplated for achieving a desired lighting profile.

Referring now to FIGS. 1 and 3, a heat sink 78 can be disposed over each of the first and second lighting modules 24, 26 and can be configured to dissipate heat away from the first and second lighting modules 24, 26. The heat sink 78 can be formed of any of a variety of a thermally conductive materials, such as aluminum or copper, for example. The heat sink 78 can be in contact with the submounts 56, 58 on an opposite side from the LEDs (e.g., 60). Heat generated by the LEDs (e.g., 60) can be transferred from the submounts 56, 58 to the heat sink 78 and dissipated to the surrounding environment by a plurality of fins 80. In one embodiment, a heat sink compound (not shown), such as thermal paste, for example, can be provided between the submounts 56, 58 and the heat sink 78 to enhance the thermal conductivity therebetween. Although the heat sink 78 is shown to be a unitary component that is provided over the first and second lighting modules 24, 26, it is to be appreciated that dedicated heat sinks can alternatively be provided for each of the first and second lighting modules 24, 26.

Referring now to FIG. 3, a controller 82 can be disposed in the controller receptacle 52 and can be configured to power and control the first and second lighting modules 24, 26. As illustrated in FIG. 1, the lid portion 54 of the cover member 44 can overlie the controller receptacle 52 and the controller 82. The lid portion 54 can serve as a heat sink for the controller 82 and can include a plurality of fins 84 to facilitate dissipation of heat from the controller 82. A heat sink compound (not shown), such as thermal paste, for example, can be provided between the lid portion 54 and the controller 82 to enhance the thermal conductivity therebetween. The main frame 42 and the cover member 44 can each be formed of a thermally conductive material such as aluminum, for example. Heat from the first and second lighting modules 24, 26 and the controller 82 can be transmitted throughout the housing 22 to effectively supplement the cooling properties of the heat sink 78 and the lid portion 54.

Referring now to FIGS. 1 and 2, the housing 22 can define a passageway 85 that extends between the light support portion 30 and the controller support portion 32 such that the first and second lighting modules 24, 26 and the controller 82 are physically spaced from each other. The passageway 85 can be configured to allow air to flow between the light support portion 30 and the controller support portion 32 to enhance cooling of the first and second lighting modules 24, 26 and the controller 82 during operation. In one embodiment, as illustrated in FIG. 3, the housing 22 can comprise a plurality of rib members 86 that extend between the light support portion 30 and the controller support portion 32 to provide structural rigidity therebetween.

Figure 6:
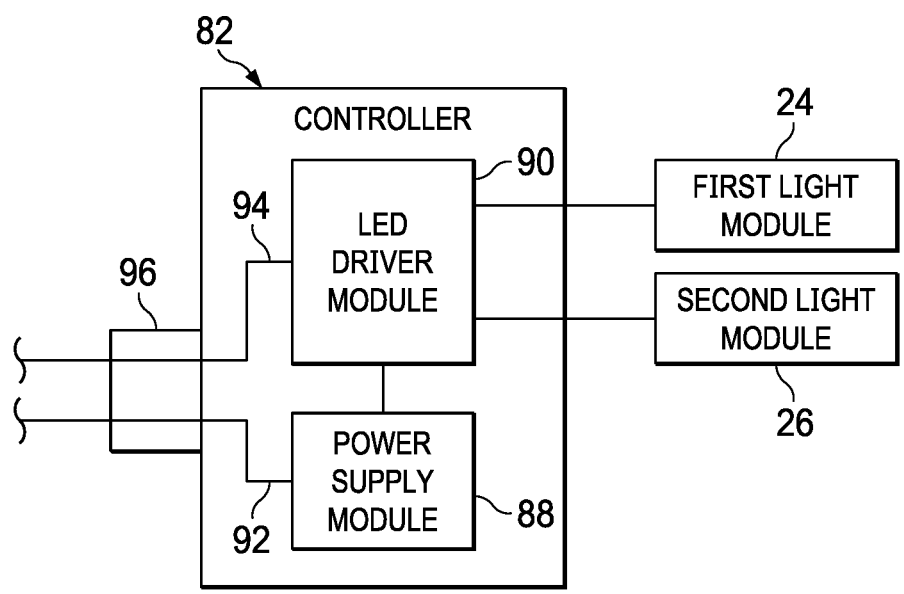
FIG. 6 is a schematic view of various components of the light fixture of FIG. 1.
Figure 7:
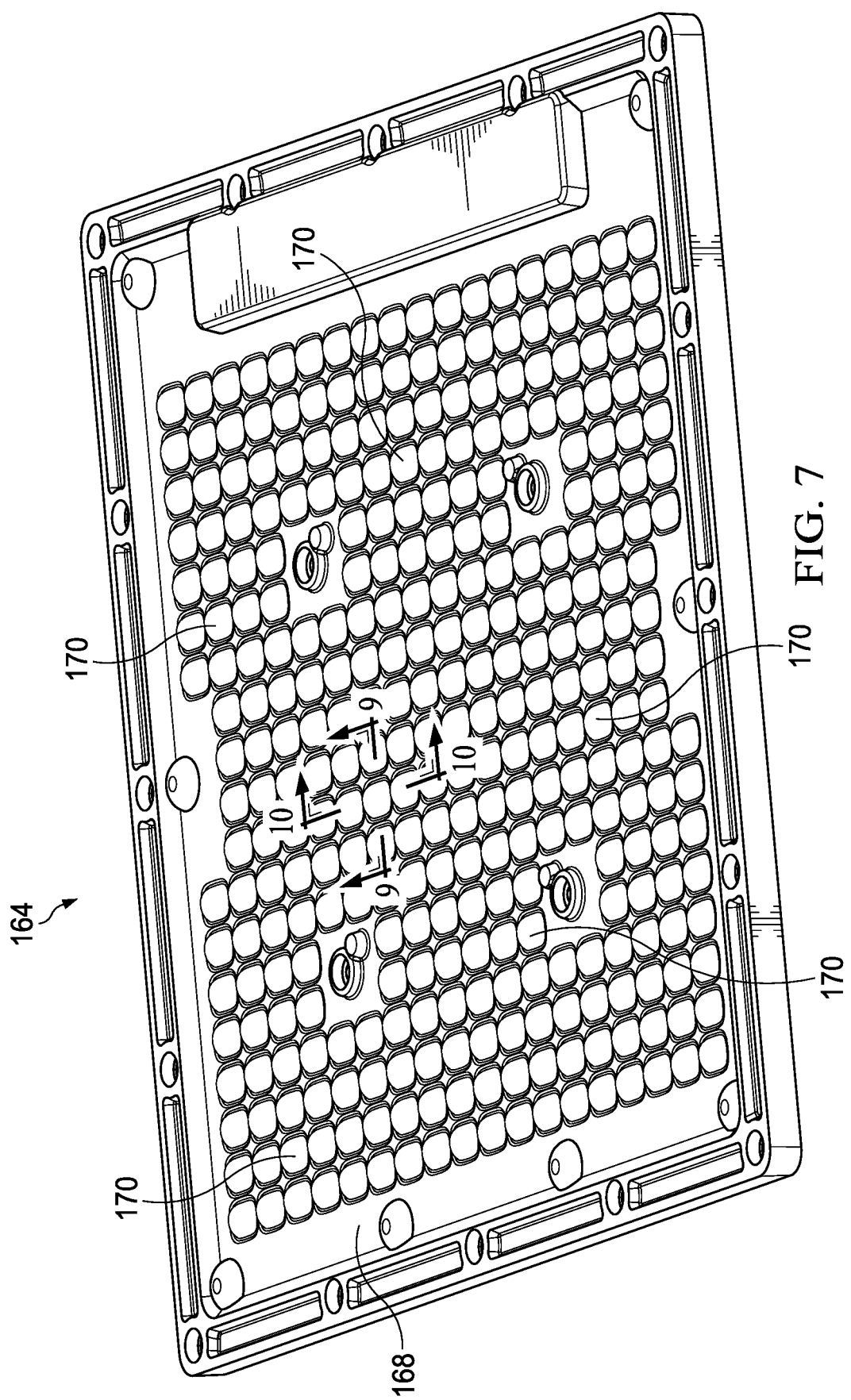
FIG. 7 is a lower isometric view depicting a lens cover for a light fixture, in accordance with another embodiment.
Figure 8:
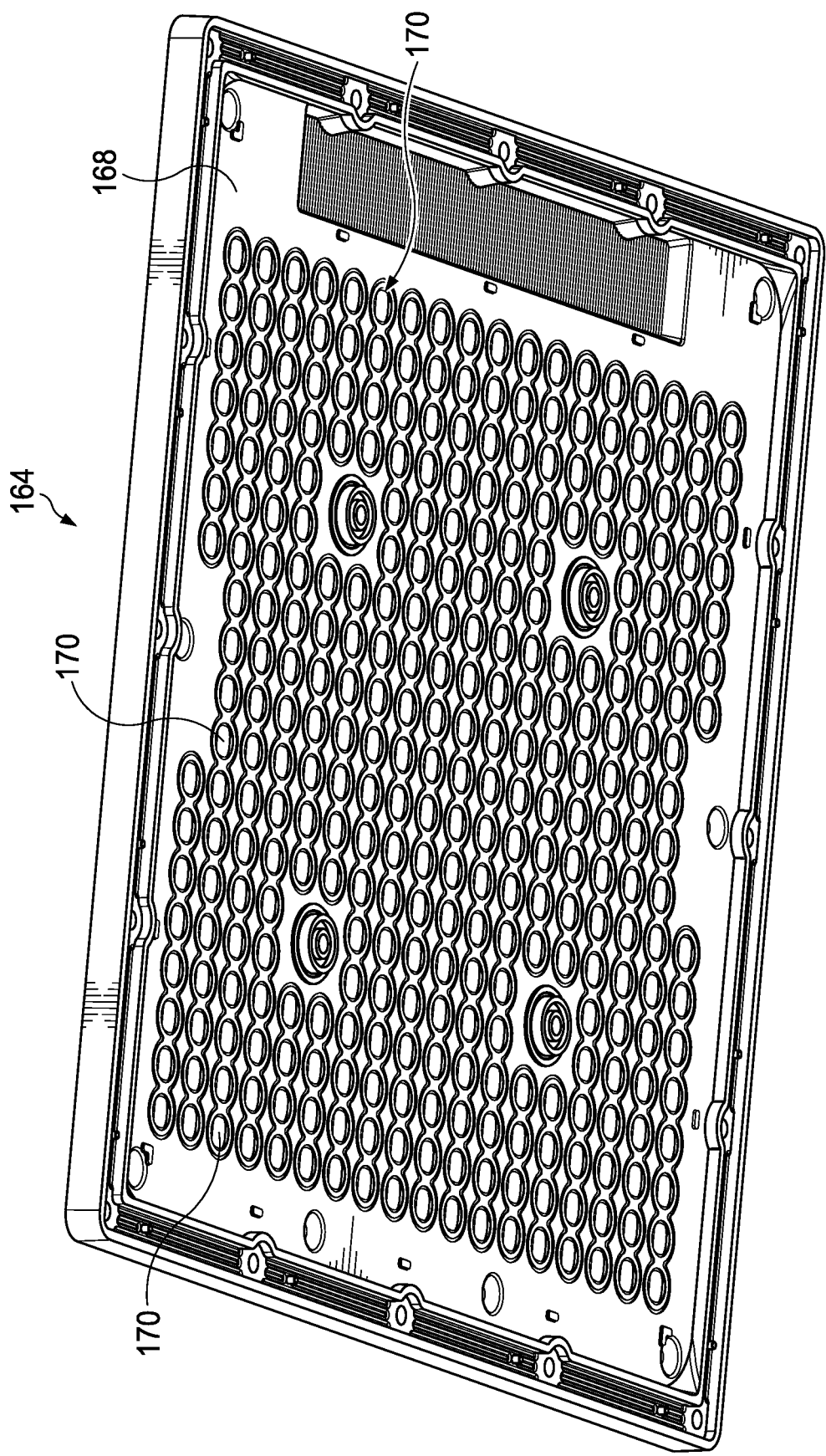
FIG. 8 is an upper isometric view depicting the lens cover of FIG. 7.

Referring now to FIG. 6, the controller 82 can include a power supply module 88 and an LED driver module 90. The power supply module 88 can be coupled with the LED driver module 90, and the LED driver module 90 can be coupled with each of the first and second lighting modules 24, 26 (e.g., in parallel). The power supply module 88 can include a power input 92 that is coupled with a power source (not shown), such as an A/C power source, for delivering external power to the power supply module 88 for powering the first and second lighting modules 24, 26. The power supply module 88 can be configured to condition the external power from the power source (e.g., transform AC power to DC power) to facilitate powering of the LEDs (e.g., 60). In one embodiment, the light fixture 20 can be configured to operate at an input power of between about 85 VAC and about 347 VAC (e.g., a 750 Watt load capacity).

The LED driver module 90 can include a control input 94 that is coupled with a control source (not shown), such as a greenhouse controller, for example, that delivers a control signal to the LED driver module 90 for controlling the first and second lighting modules 24, 26, as will be described in further detail below. The LED driver module 90 can be configured to communicate according to any of a variety if suitable signal protocols, such as BACnet, ModBus, or RS485, for example.

The power input 92 and the control input 94 can be routed to a socket 96 (FIGS. 2 and 6) that is configured to interface with a plug (not shown) that can deliver the external power and control signals to the power supply module 88 and the LED driver module 90, respectively. In one embodiment, the socket 96 can be a Wieland-type connector, although other connector types are contemplated. It is to be appreciated that although the power and control signals are shown to be delivered through the socket 96 (e.g., via the same cable), the light fixture 20 can alternatively include separate ports for the power and the control signal such that the power and the control signal are transmitted to the power supply module 88 and the LED driver module 90 along different cables.

The LED driver module 90 can be configured to control one or more of the intensity, color, and spectrum of the light generated by the LEDs (e.g., 60) as a function of time (e.g., a light recipe). The LED driver module 90 can control the light recipe of the first and second lighting modules 24, 26 independently such that the first and second lighting modules 24, 26 define respective first and second lighting zones that are independently controllable within the lighting environment. The light recipes of the first and second lighting zones can accordingly be tailored to accommodate the lighting requirements of plants that are provided within the lighting environment. For example, when the plants provided in each of the first and second lighting zones are the same (or have similar lighting requirements), the respective light recipes for the first and second lighting modules 24, 26 can be the same to provide a substantially uniform lighting environment between the first and second lighting zones. When a group of plants provided in the first lighting zone has a different lighting requirement from a group of plants provided in the second lighting zone, the respective light recipes for the first and second lighting modules 24, 26 can be tailored to accommodate the different lighting requirements between the groups of plants. In one embodiment, the first and second lighting modules 24, 26 can have unique addresses such that the control signal can assign separate lighting recipes to each of the first and second lighting modules 24, 26 (via the LED driver module 90) based upon their unique addresses. It is to be appreciated, that although the LED driver module 90 is described as being configured to control the light recipe of each of the first and second lighting modules 24, 26, the LED driver module 90 can additionally or alternatively be configured to control any of a variety of suitable alternative variable lighting features of the first and second lighting modules 24, 26 (e.g., any lighting feature that can be controlled in real time with a control signal).

The first and second lighting modules 24, 26 can be self-contained, stand-alone units that are physically separate from each other. As such, the physical configuration and variable lighting features of each of the first and second lighting modules 24, 26 can be individually selected to allow the first and second lighting zones to be customized to achieve a desired lighting environment. In one embodiment, the first and second lighting modules 24, 26 can be exchanged with different lighting modules during the life cycle of a plant to optimize the lighting environment for the plant throughout its life cycle.

FIGS. 7-11 illustrate an alternative embodiment of a lens cover 164 that can be similar to, or the same in many respects as, the lens cover 64 described above and illustrated in FIGS. 4 and 5. For example, the lens cover 164 can include a base substrate 168 and a plurality of optical lens elements 170 that protrude from the base substrate 168 and are substantially convex-shaped. However, the optical lens elements 170 illustrated in FIGS. 7-10 can have a different shape and thus different optical characteristics than the optical lens elements 70 illustrated in FIG. 5.

Figure 9:
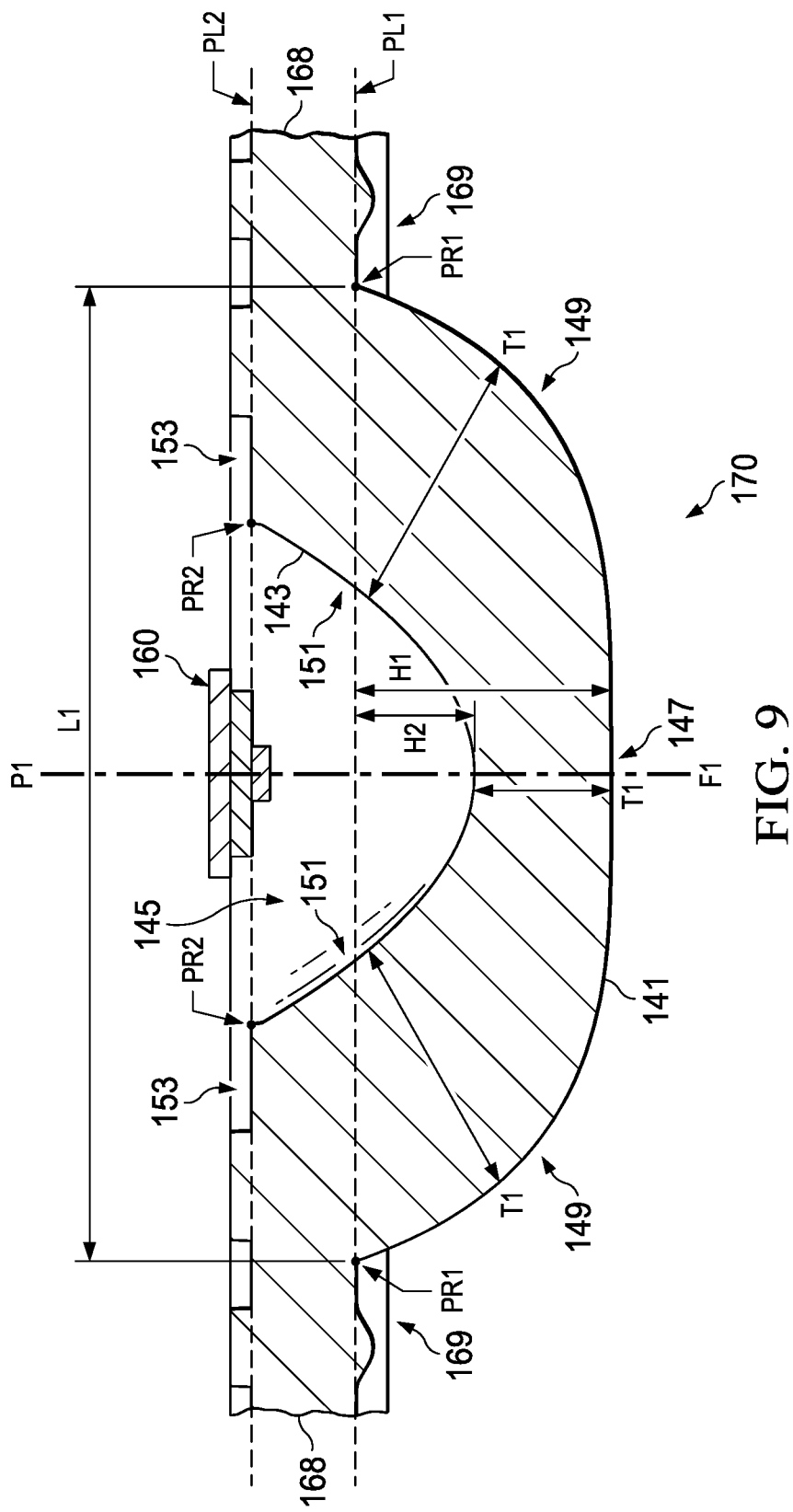
FIG. 9 is a sectional view taken along the line 9-9 in FIG. 7.
Figure 10:
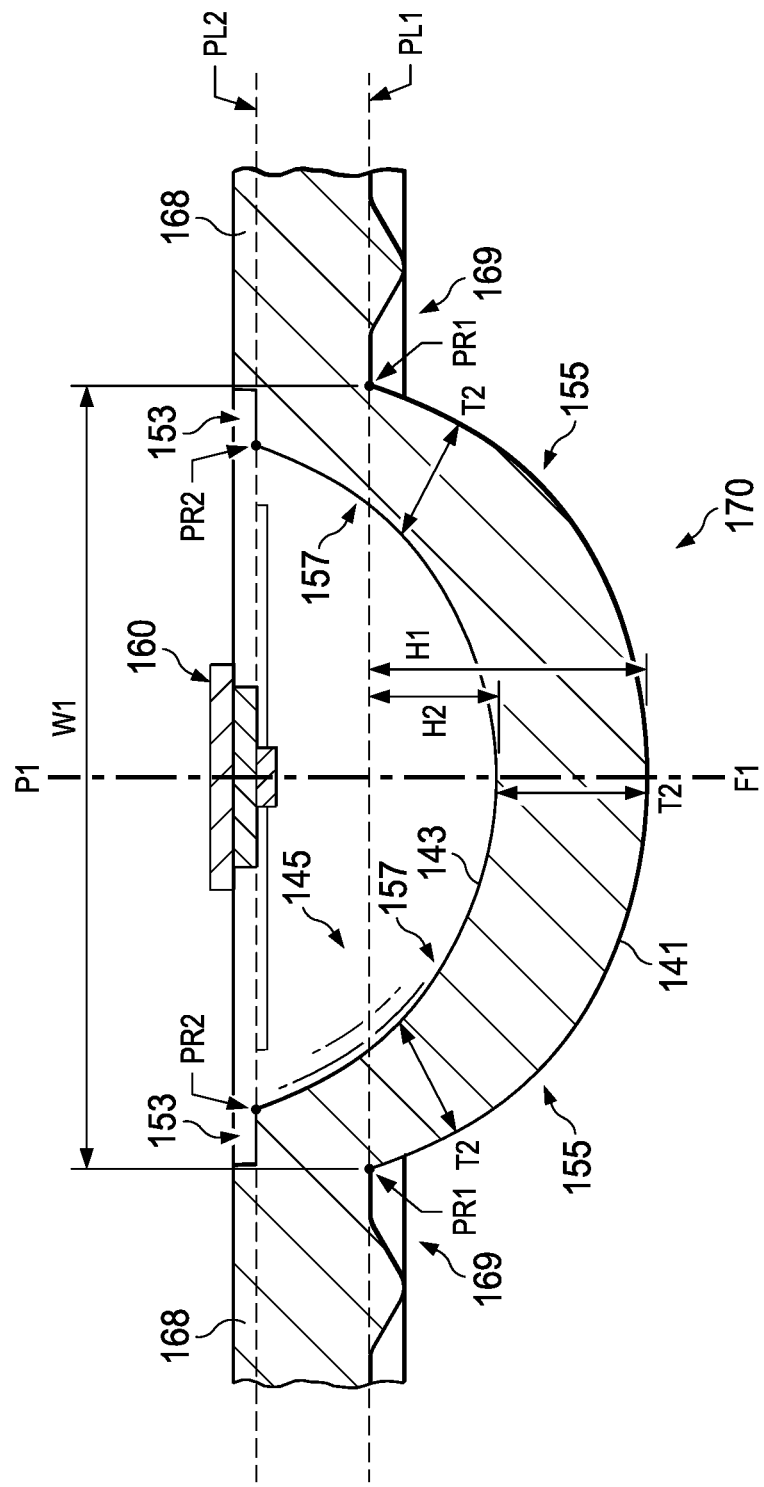
FIG. 10 is a sectional view taken along the line 10-10 in FIG. 7.
Figure 11:
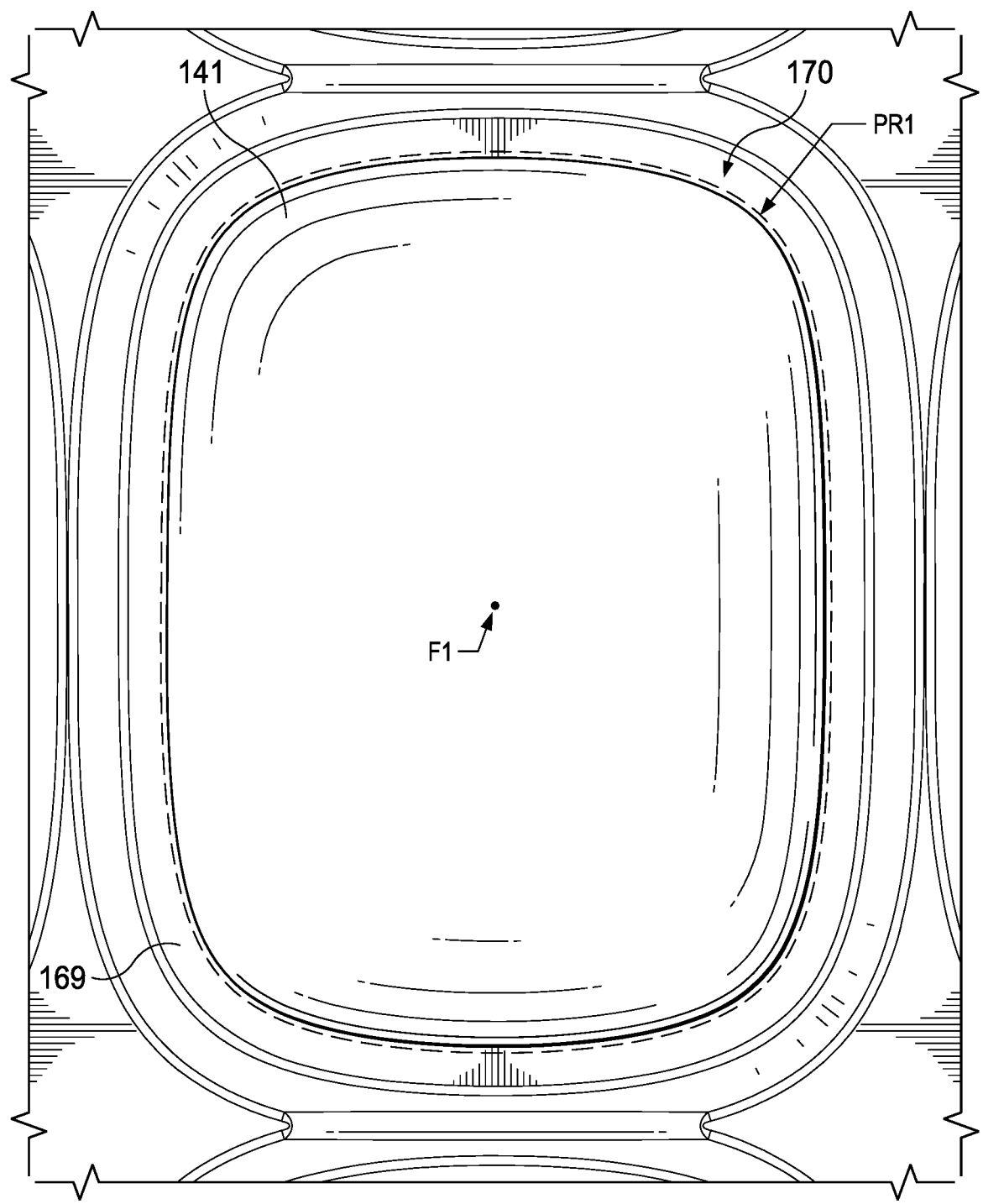
FIG. 11 is an enlarged top plan view of the lens cover of FIG. 7.

Referring now to FIGS. 9-11, one of the optical lens elements 170 will now be described but can be understood to be representative of the rest of the optical lens elements 170 of the lens cover 164. As illustrated in FIGS. 9 and 10, the optical lens element 170 can include an exterior surface 141 and an interior surface 143 that are spaced from each other. The exterior surface 141 and the interior surface 143 can each be a continuously smooth surface that is devoid of any surface discontinuities (e.g., two or more discrete surfaces that are visible with the human eye and that are angled relative to each other).

Figure 12:
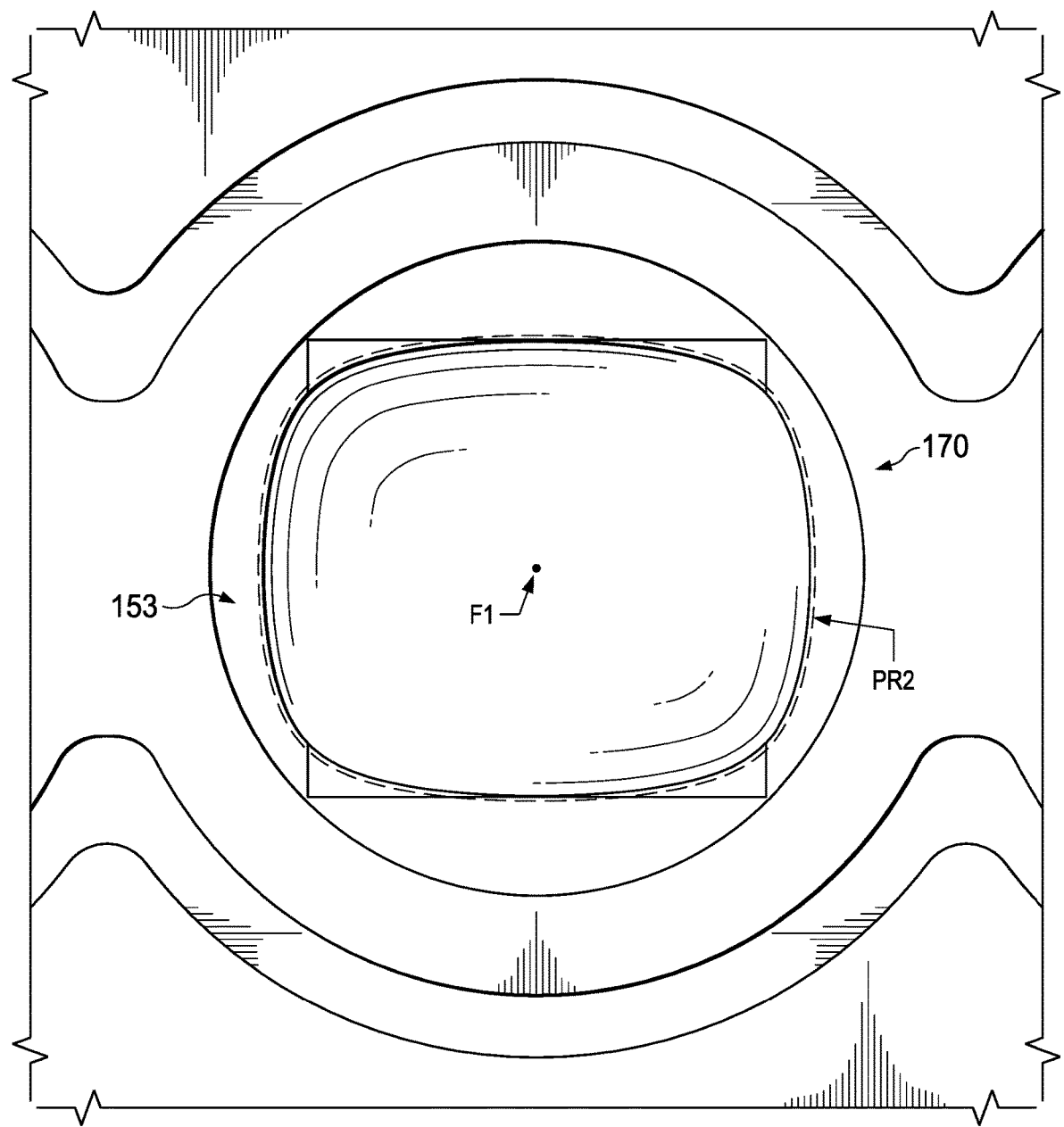
FIG. 12 is an enlarged bottom plan view of the lens cover of FIG. 7.

The interior surface 143 can define an interior cavity 145. An LED 160 can be at least partially disposed within the interior cavity 145, and an encapsulating material (e.g., 74) can be provided within the interior cavity 145 such that the encapsulating material (e.g., 74) substantially fills the interior cavity 145 and encapsulates the LED 160 therein. The LED 160 can have a physical center P1, and the optical lens element 170 can have a focal center F1 that are substantially coaxial with each other. In an alternative embodiment, the LED 160 can be slightly offset with the optical lens element 170 such that the physical center P1 and the focal center F1 are non-coaxial. The exterior surface 141 can be substantially convex shaped and can extend from the base substrate 168 along an outer perimeter PR1 (FIG. 11). The interior surface 143 can be substantially convex shaped and can extend from the base substrate 168 along an inner perimeter PR2 (FIG. 12). The optical lens element 170 can have a two-dimensional shape (taken at a cross-section that is orthogonal to the focal center F1) that is substantially rectangular but with rounded corners. The base substrate 168 can define an annular groove 169 that extends circumferentially around the optical lens element 170 and to facilitate releasement of the lens cover 164 form a mold when formed via a molding process. The optical lens element 170 can be substantially symmetrical about the focal center F1.

As illustrated in FIG. 9, the optical lens element 170 can have a length L1 that extends between opposite sides of the outer perimeter PR1 and is orthogonal to the focal center F1. The exterior surface 141 can be symmetrical about the focal center F1 along the length L1. The exterior surface 141 can have a central profile 147 that intersects the focal center F1 and a pair of outer curved profiles 149 that extend from opposite sides of the central profile 147 to the outer perimeter PR1. The central profile 147 and the pair of outer curved profiles 149 can cooperate to define a lengthwise two-dimensional profile (taken at a cross-section that is orthogonal to a width W1 (FIG. 10)) for the exterior surface 141. The central profile 147 can be substantially planar and can be perpendicular to the focal center F1. The central profile 147 can extend over about ⅓ the length L1 of the optical lens element 170 and each of the outer curved profiles 149 can extend over about ⅓ the length L1 of the optical lens element 170 such that the exterior surface 141 has a flattened, semi-ovular lengthwise two-dimensional shape. The exterior surface 141 can be bisected by the focal center F1 of the optical lens element 170 (relative to the length L1) and can have a lengthwise two-dimensional shape that is substantially symmetric (e.g., entirely symmetric) about the focal center F1 (e.g., the exterior surface 141 located on one side of the focal center F1 is a mirror image of the exterior surface 141 located on the other side of the focal center F1).

The interior surface 143 can be symmetrical about the focal center F1. The interior surface 143 can include a pair of curved profiles 151 that extend from opposite sides of the focal center F1 to the inner perimeter PR2. The curved profiles 151 can have a different shape than the outer curved profiles 149. The curved profiles 151 can cooperate to define a lengthwise two-dimensional shape (taken at a cross-section that is orthogonal to the width W1) for the interior surface 143 that is substantially parabolic shaped. In one embodiment, the outer curved profiles 149 can have a greater curvature than the curved profiles 151 (e.g., a radius of curvature of the outer curved profiles 149 can be greater than a radius of curvature of the curved profiles 151). The interior surface 143 can be bisected by the focal center F1 of the optical lens element 170 (relative to the length L1) and can have a lengthwise two-dimensional shape that is substantially symmetric (e.g., entirely symmetric) about the focal center F1.

The lens cover 164 can define a recess 153 adjacent to the interior surface 143 and the interior cavity 145. The recess 153 can be configured to capture excess encapsulating material (e.g., 74) that may be squeezed from the interior cavity 145 when the submount (e.g., 56) is pressed into the lens cover 164 during manufacturing. In one embodiment, the recess 153 can extend circumferentially around the interior surface 143. The recess 153 can also enhance demolding of the optical lens element 170 during manufacturing and can encourage the isolation of light between adjacent optical lens elements 170.

The exterior surface 141 and the interior surface 143 can cooperate to define an overall lengthwise two-dimensional shape for the optical lens element 170 that has a material thickness T1. Because the exterior surface 141 and the interior surface 143 have different overall lengthwise two-dimensional shapes, the material thickness T1 at the outer perimeter PR of the optical lens element 170 can be thicker than the material thickness T1 at the focal center F1. In one embodiment, the material thickness T1 at the focal center F1 can be between about 2 mm and about 3 mm and more particularly about 2.4 mm.

As illustrated in FIG. 10, the optical lens element 170 can have a width W1 that extends between opposite sides of the outer perimeter PR1 and is orthogonal to the length L1 (FIG. 9) and to the focal center F1. The width W1 can be understood to be the narrowest dimension of the optical lens element 170 measured at the outer perimeter PR1 in a direction that is orthogonal to the focal center F1. The width can be narrower than the length L1. The ratio of the width W1 to the length can be about 2:3. In one embodiment, the width W1 can be between about 6.5 mm and about 7.5 mm and more particularly about 6.9 mm, and the length L1 can be between about 8.5 mm and about 10 mm and more particularly about 9.3 mm.

The exterior surface 141 can be symmetrical about the focal center F1 along the width W1. The exterior surface 141 can be bisected by the focal center F1 of the optical lens element 170 (relative to the width W1) and can have a widthwise two-dimensional shape (taken at a cross-section that is orthogonal to the length L1) that is substantially symmetric (e.g., entirely symmetric) about the focal center F1. The interior surface 143 can be symmetrical about the focal center F1 along the width W1. The interior surface 143 can also be bisected by the focal center F1 of the optical lens element 170 (relative to the width W1) and can have a widthwise two-dimensional shape (taken at a cross-section that is orthogonal to the length L1) that is substantially symmetric (e.g., entirely symmetric) about the focal center F1.

The exterior surface 141 can include a pair of curved profiles 155 that extend from opposite sides of the focal center F1 to the outer perimeter PR1. The curved profiles 155 can cooperate to define a widthwise two-dimensional shape (taken at a cross-section that is orthogonal to the width W1) for the exterior surface 141 that is substantially semicircular shaped. The interior surface 143 can include a pair of curved profiles 157 that extend from opposite sides of the focal center F1 to the outer perimeter PR1. The curved profiles 157 can cooperate to define a widthwise two-dimensional shape (taken at a cross-section that is orthogonal to the width W1) for the interior surface 143 that is substantially semicircular shaped. In one embodiment, the curved profiles 155 can have a greater curvature than the curved profiles 157 (e.g., a radius of curvature of the curved profiles 155 can be greater than a radius of curvature of the curved profiles 157).

The exterior surface 141 and the interior surface 143 can cooperate to define an overall widthwise two-dimensional shape for the optical lens element 170 that has a material thickness T2. Because the exterior surface 141 and the interior surface 143 have different overall widthwise two-dimensional shapes, the material thickness T2 at the focal center F1 of the optical lens element 170 can be thicker than the material thickness T2 at the outer perimeter PR1. In one embodiment, the material thickness T2 at the focal center F1 can be between about 2 mm and about 3 mm and more particularly about 2.4 mm.

Referring now to FIGS. 9 and 10, the outer perimeter PR1 can reside within a first imaginary plane PL1 and the inner perimeter PR2 can reside within a second imaginary plane PL2. The exterior surface 141 can be spaced from the first imaginary plane PL1 by a height H1 that is measured along the focal center F1. In one embodiment, the height H1 can be between about 2 mm and about 3 mm and more particularly about 2.5 mm. The interior surface 143 can be spaced from the first imaginary plane PL1 by a height H2 that is measured along the focal center F1. In one embodiment, the height H2 can be between about 0.75 mm and about 1.25 mm and more particularly about 1.0 mm.

Figure 13:
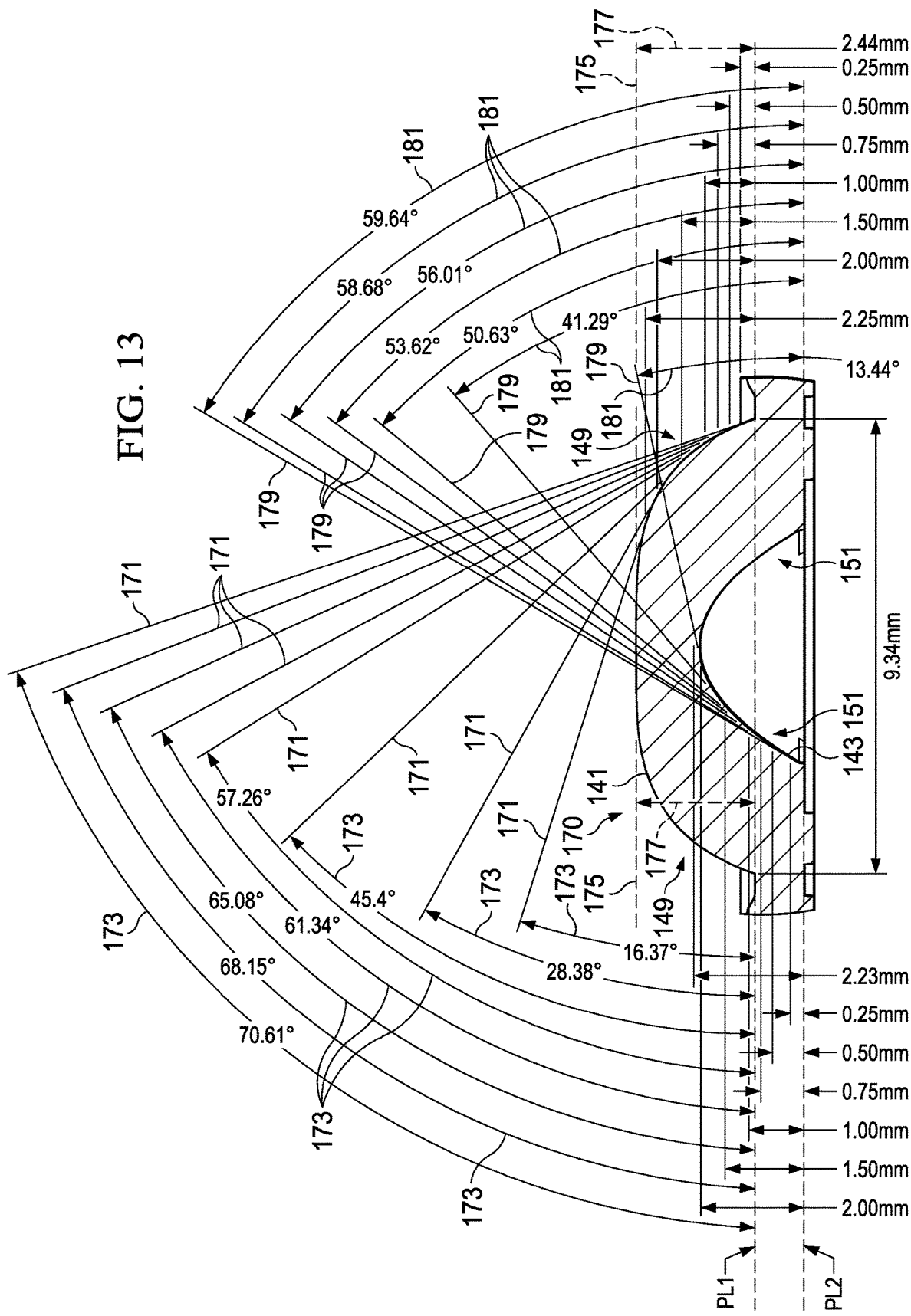
FIG. 13 is a sectional view taken along the line 9-9 in FIG. 7.

Referring now to FIG. 13, a plurality of imaginary lines 171 can be provided at different locations on each of the outer curved profiles 149 of the exterior surface 141. Each of the imaginary lines 171 can be tangent to the outer curved profile 149 such that each imaginary line 171 is angled with respect to the first imaginary plane PL1 by an angle 173. Each of the outer curved profiles 149 can be sloped (e.g., contoured) towards respective ones of the central profiles 147 such that the angle 173 of each imaginary line 171 is less than the angles 173 of the imaginary lines 171 that are more proximate the first imaginary plane PL1 and greater than the angles 173 of the imaginary lines 171 that are more proximate the focal center F1.

A plurality of imaginary lines 175 (one shown) can be provided at different locations on the central profile 147 of the exterior surface 141. Each of the imaginary lines 175 can be tangent to the central profile 147 such that each imaginary line 175 is angled with respect to the first imaginary plane PL1 by an angle 177. The central profile 147 can be angled (e.g., contoured) upwardly toward the focal center F1 such that the angle 177 of each imaginary line 175 is less than or equal to the angles 177 of the imaginary lines 175 that are more proximate the first imaginary plane PL1 and greater than or equal to the angles 177 of the imaginary lines 175 that are more proximate the focal center F1.

A plurality of imaginary lines 179 can be provided at different locations on each of the curved profiles 151 of the interior surface 143. Each of the imaginary lines 179 can be tangent to the curved profiles 151 such that each imaginary line 179 is angled with respect to the second imaginary plane PL2 by an angle 181. Each of the curved profiles 151 can be sloped (e.g., contoured) towards the focal center F1 such that the angle 181 of each imaginary line 179 is less than the angles 181 of the imaginary lines 179 that are more proximate the second imaginary plane PL2 and greater than the angles 181 of the imaginary lines 179 that are more proximate the focal center F1. In one embodiment, the angle 173 of respective ones of the imaginary lines 171 that are most proximate to the first imaginary plane PL1 is about 70 degrees, the angle 177 of the imaginary lines 175 that are most proximate to respective ones of the outer curved profiles 149 extending from the central profile 147 is about 3 degrees, and the angle 181 of respective ones of the imaginary lines 179 that are most proximate to the second imaginary plane PL2 is about 71 degrees.

Figure 14:
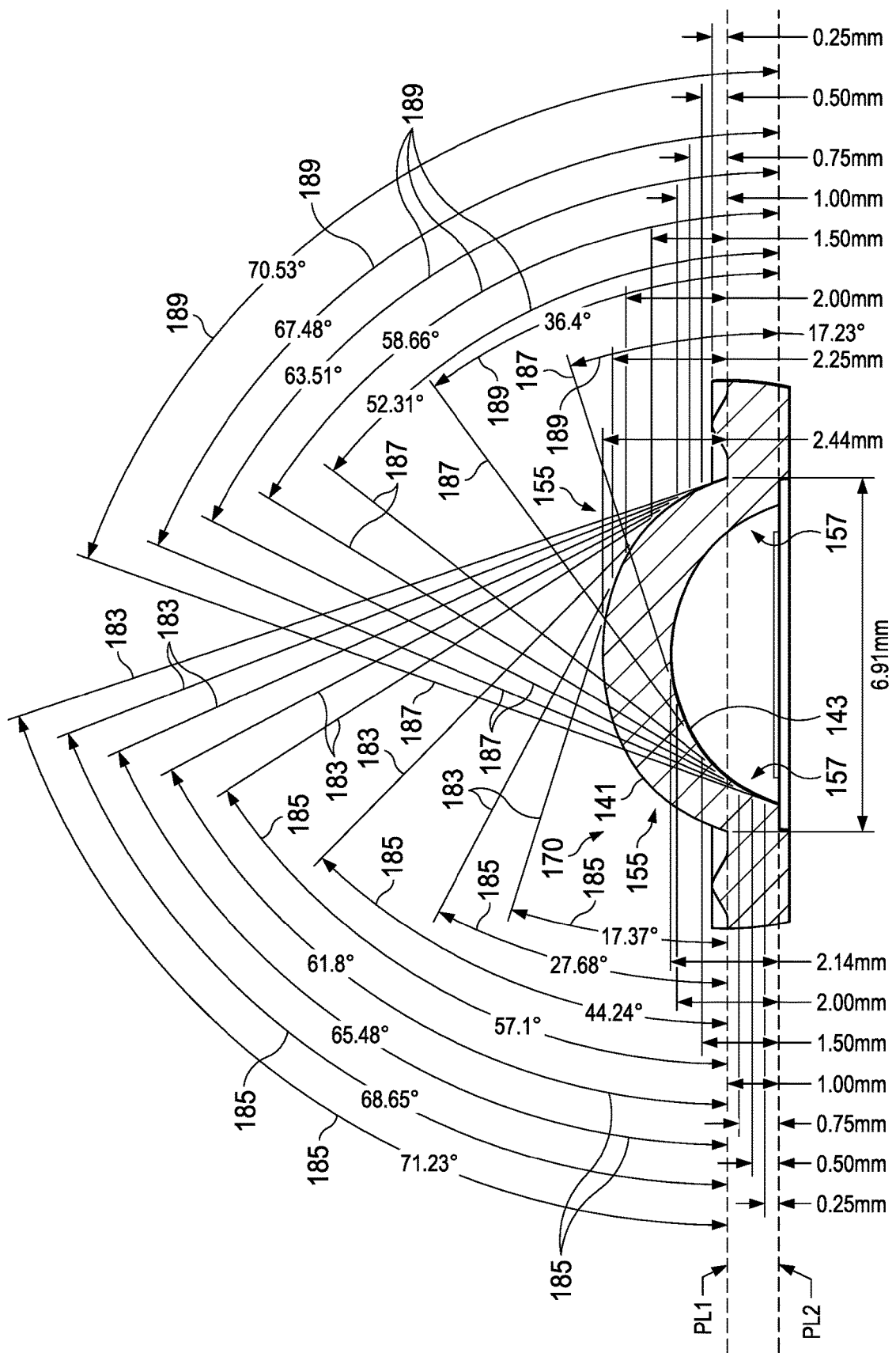
FIG. 14 is a sectional view taken along the line 10-10 in FIG. 7.

Referring now to FIG. 14, a plurality of imaginary lines 183 can be provided at different locations on each of the curved profiles 155 of the exterior surface 141. Each of the imaginary lines 183 can be tangent to the curved profile 155 such that each imaginary line 183 is angled with respect to the first imaginary plane PL1 by an angle 185. Each of the curved profiles 155 can be sloped (e.g., contoured) towards the focal center F1 such that the angle 185 of each imaginary line 183 is less than the angles 185 of the imaginary lines 183 that are more proximate the first imaginary plane PL1 and greater than the angles 185 of the imaginary lines 183 that are more proximate the focal center F1.

A plurality of imaginary lines 187 can be provided at different locations on each of the curved profiles 157 of the interior surface 143. Each of the imaginary lines 187 can be tangent to the curved profile 157 such that each imaginary line 187 is angled with respect to the second imaginary plane PL2 by an angle 189. Each of the curved profiles 157 can be sloped (e.g., contoured) towards the focal center F1 such that the angle 185 of each imaginary line 187 is less than the angles 189 of the imaginary lines 187 that are more proximate the second imaginary plane PL2 and greater than the angles 189 of the imaginary lines 187 that are more proximate the focal center F1. In one embodiment, the angle 185 of respective ones of the imaginary lines 183 that are most proximate to the first imaginary plane PL1 is about 60 degrees, and the angle 189 of respective ones of the imaginary lines 187 that are most proximate to the second imaginary plane PL2 is about 71 degrees.

Figure 15:
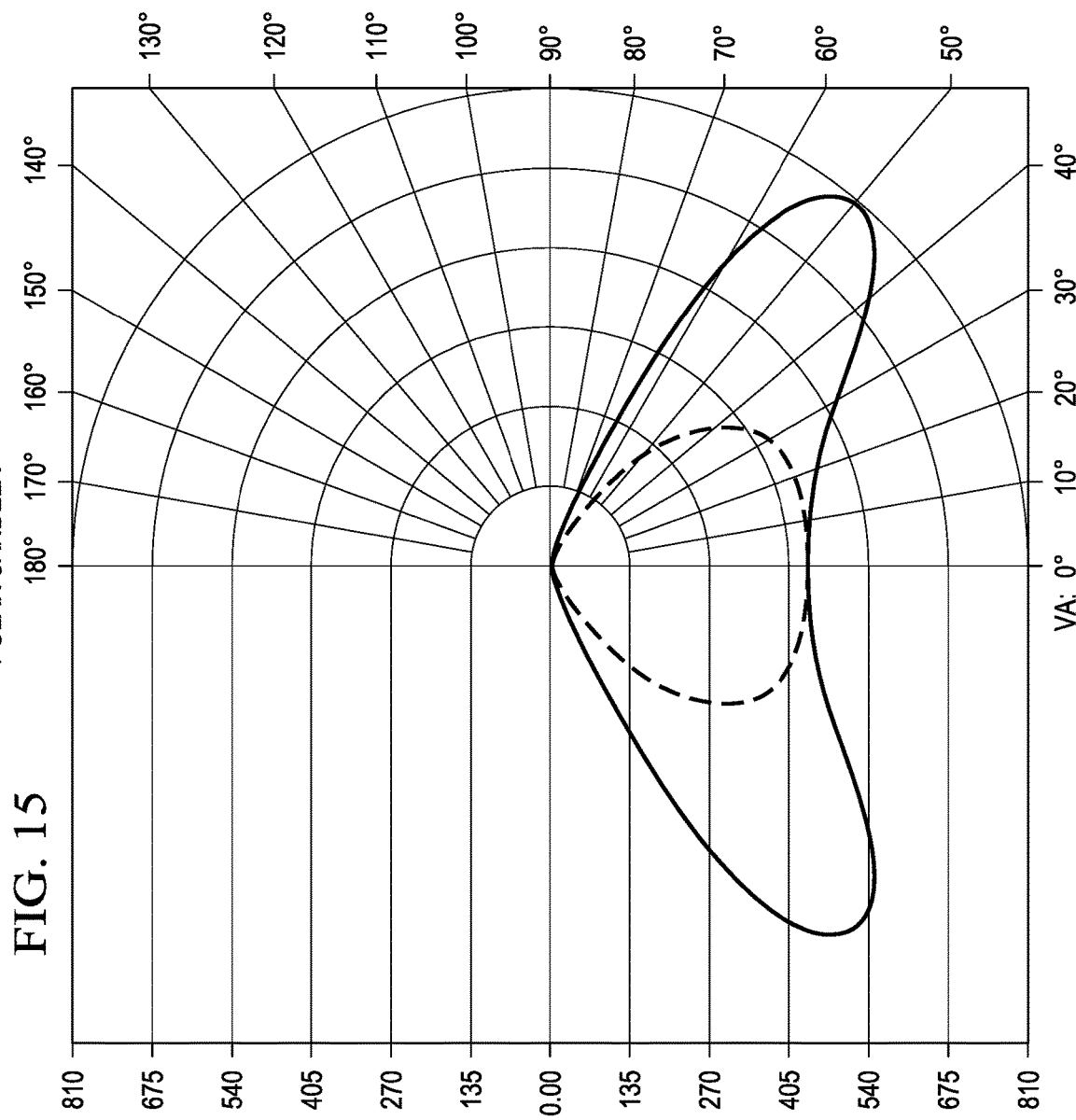
FIG. 15 is an IES light distribution plot for the lens cover of FIG. 7.

Referring again to FIG. 7, the optical lens elements 170 can be provided in a grid-like arrangement on the base substrate 168. Each optical lens element 170 can cooperate with the underlying LED (e.g., 160) to provide light distribution from each optical lens element 170 that is more effective at providing light to underlying plant(s) than conventional horticultural lighting arrangements. One example of an IES light distribution plot for the lens cover 164 is illustrated in FIG. 15.

When a plurality of light fixtures (e.g., 20) that incorporate the lens cover 164 are arranged in an indoor growing facility in a similar manner as conventional lighting arrangements (e.g., the same number of light fixtures and fixture layout as the conventional arrangements), the light fixtures (e.g., 20) can be more energy efficient, can achieve better light uniformity, and can have a higher photosynthetic photon flux density (PPFD) than the conventional lighting arrangements.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A lens cover for a plurality of light emitting devices, the lens cover comprising:
   a base substrate; and
   an optical lens element that extends from the base substrate and defines a focal center, the optical lens element having a length and a width and comprising:
      an exterior surface that extends from the base substrate along an outer perimeter and is symmetrical about the focal center, the exterior surface comprising:
         a first lengthwise two-dimensional profile at a cross-section taken orthogonal to the width at the focal center, the first lengthwise two-dimensional profile comprising a central profile and a pair of first curved profiles extending from the central profile, the central profile having a central radius of curvature and the first curved profiles each having a first radius of curvature, the central radius of curvature being greater than the first radius of curvature; and a first widthwise two-dimensional profile at a cross-section taken orthogonal to the length at the focal center, the first widthwise two-dimensional profile comprising a pair of second curved profiles extending from the focal center such that the first widthwise two-dimensional profile is substantially semicircular shaped, each second curved profile having a second radius of curvature; and an interior surface that is symmetrical about the focal center, the interior surface comprising:
  a second lengthwise two-dimensional profile at a cross-section taken orthogonal to the width at the focal center, the second lengthwise two-dimensional profile comprising a pair of third curved profiles extending from the focal center and each having a third radius of curvature that is less than the central radius of curvature and greater than the first radius of curvature; and
  a second widthwise two-dimensional profile at a cross-section taken orthogonal to the length at the focal center, the second widthwise two-dimensional profile comprising a pair of fourth curved profiles extending from the focal center and each having a fourth radius of curvature that is less than the second radius of curvature, wherein:
    the width is narrower than the length;
    the exterior surface and the interior surface cooperate to define an overall lengthwise two-dimensional shape at a cross-section taken orthogonal to the width at the focal center;
    the overall lengthwise two-dimensional shape has a first material thickness that is thicker at the outer perimeter than at the focal center;
    the central profile extends over at least about one third of the length; and
    the central profile is substantially planar.

2. The lens cover of claim 1 wherein:
the exterior surface and the interior surface cooperate to define an overall widthwise two-dimensional shape at a cross-section taken orthogonal to the length at the focal center; and
the overall widthwise two-dimensional shape has a second material thickness that is thicker at the focal center than at the outer perimeter.

3. The lens cover of claim 1 wherein the width is the narrowest dimension of the optical lens element measured at the outer perimeter in a direction that is orthogonal to the focal center.

4. The lens cover of claim 3 wherein a ratio of the width to the length is about 2:3.

5. The lens cover of claim 4 wherein the width is between about 6.5 mm and about 7.5 mm and the length is between about 8.5 mm and about 10 mm.

6. The lens cover of claim 1 wherein the optical lens element has a substantially rectangular shape but with rounded corners when viewed along the focal center.

7. The lens cover of claim 1 wherein:
the outer perimeter resides within an imaginary plane;
the exterior surface is spaced from the imaginary plane by a first height that is measured along the focal center;
the interior surface is spaced from the imaginary plane by a second height that is measured along the focal center;
the first height is between about 2.0 mm and about 3.0 mm; and the second height is between about 0.75 mm and about 1.25 mm.

8. The lens cover of claim 1 wherein the central radius of curvature is less than about 3 degrees.

9. The lens cover of claim 6 wherein the base substrate defines an annular groove that extends circumferentially around the optical lens element adjacent the exterior surface.

10. A lens cover for a plurality of light emitting devices, the lens cover comprising:
a base substrate; and
an optical lens element defining a focal center having a length and a width and comprising:
  an exterior surface that extends from the base substrate along an outer perimeter that resides within a first imaginary plane, the exterior surface being symmetrical about the focal center, the exterior surface comprising:
    a first lengthwise two-dimensional profile at a cross-section taken orthogonal to the width at the focal center, the first lengthwise two-dimensional profile comprising a central profile and a pair of first curved profiles extending from the central profile; and
    a first widthwise two-dimensional profile at a cross-section taken orthogonal to the length at the focal center, the first widthwise two-dimensional profile comprising a pair of second curved profiles extending from the focal center such that the first widthwise two-dimensional profile is substantially semicircular shaped; and
  an interior surface that extends from the base substrate along an inner perimeter that resides within a second imaginary plane, the interior surface being symmetrical about the focal center, the interior surface comprising:
    a second lengthwise two-dimensional profile at a cross-section taken orthogonal to the width at the focal center, the second lengthwise two-dimensional profile comprising a pair of third curved profiles extending from the focal center; and
    a second widthwise two-dimensional profile at a cross-section taken orthogonal to the length at the focal center, the second widthwise two-dimensional profile comprising a pair of fourth curved profiles extending from the focal center, wherein:
      the width is narrower than the length;
      a plurality of first imaginary lines are provided at different locations on the first curved profile and are tangent to the first curved profile such that each first imaginary line is angled with respect to the first imaginary plane by a first angle;
      the first curved profile is contoured such that the first angle of each first imaginary line is less than the first angles of the first imaginary lines that are more proximate the first imaginary plane and greater than the first angles of the first imaginary lines that are more proximate the focal center;
      a plurality of second imaginary lines are provided at different locations on the second curved profile and are tangent to the second curved profile such that each second imaginary line is angled with respect to the second imaginary plane by a second angle;
      the second curved profile is contoured such that the second angle of each second imaginary line is less than the second angles of the second imaginary lines that are more proximate the first imaginary plane and greater than the second angles of the second imaginary lines that are more proximate the focal center;

a plurality of third imaginary lines are provided at different locations on the third curved profile and are tangent to the third curved profile such that each third imaginary line is angled with respect to the second imaginary plane by a third angle;

the third curved profile is contoured such that the third angle of each third imaginary line is less than the third angles of the third imaginary lines that are more proximate the second imaginary plane and greater than the third angles of the third imaginary lines that are more proximate the focal center;

a plurality of fourth imaginary lines are provided at different locations on the fourth curved profile and are tangent to the fourth curved profile such that each fourth imaginary line is angled with respect to the second imaginary plane by a fourth angle;

the fourth curved profile is contoured such that the fourth angle of each fourth imaginary line is less than the fourth angles of the fourth imaginary lines that are more proximate the second imaginary plane and greater than the fourth angles of the fourth imaginary lines that are more proximate the focal center;

the central profile extends over at least about one third of the length; and the central profile is substantially planar.

11. The lens cover of claim 10 wherein:

the first angle of the first imaginary line that is most proximate to the first imaginary plane is about 70 degrees;

the second angle of the second imaginary line that is most proximate to the first imaginary plane is about 60 degrees;

the third angle of the third imaginary line that is most proximate to the second imaginary plane is about 71 degrees; and the fourth angle of the fourth imaginary line that is most proximate to the second imaginary plane is about 71 degrees.

12. The lens cover of claim 10 wherein:

a plurality of central imaginary lines are provided at different locations on the central profile and are tangent to the central profile such that each central imaginary line is angled with respect to the first imaginary plane by a central angle; and the central profile is contoured such that the central angle of each central imaginary line is greater than the central angles of the central imaginary lines that are more proximate the focal center and less than the central angles of the central imaginary lines that are more proximate the first curved profile extending from the central profile.

13. The lens cover of claim 12 wherein the central angle of the central imaginary line that is most proximate to the first curved profile extending from the central profile is less than about 3 degrees.

14. The lens cover of claim 13 wherein the base substrate defines an annular groove that extends circumferentially around the optical lens element adjacent the exterior surface.

15. The lens cover of claim 10 wherein:

the exterior surface and the interior surface cooperate to define an overall widthwise two-dimensional shape at a cross-section taken orthogonal to the length at the focal center; and the overall widthwise two-dimensional shape has a second material thickness that is thicker at the focal center than at the outer perimeter.

16. The lens cover of claim 10 wherein the width is the narrowest dimension of the optical lens element measured at the outer perimeter in a direction that is orthogonal to the focal center.

17. The lens cover of claim 16 wherein a ratio of the width to the length is about 2:3.

18. The lens cover of claim 17 wherein the width is between about 6.5 mm and about 7.5 mm and the length is between about 8.5 mm and about 10 mm.

19. The lens cover of claim 10 wherein the optical lens element has a substantially rectangular shape but with rounded corners when viewed along the focal center.

20. The lens cover of claim 10 wherein:

the outer perimeter resides within an imaginary plane;

the exterior surface is spaced from the imaginary plane by a first height that is measured along the focal center;

the interior surface is spaced from the imaginary plane by a second height that is measured along the focal center; and the first height is between about 2.0 mm and about 3.0 mm; and the second height is between about 0.75 mm and about 1.25 mm.

* * * * *